INVENTOR.
WILLIAM W. CHAMBERS
BY Fulwider, Patton, Rieber,
Lee and Utecht
ATTORNEYS United States Patent Office 3,516,484
Patented June 23, 1970

3,516,484
TEMPERATURE CONTROL SYSTEM FOR
HEATING AND COOLING APPARATUS
William W. Chambers, Anaheim, Calif., assignor to
Robertshaw Controls Company, Richmond, Va.,
a corporation of Delaware
Original application Jan. 7, 1967, Ser. No. 688,772.
Divided and this application Sept. 9, 1969, Ser.
No. 856,429
Int. Cl. F25b 29/00
U.S. Cl. 165—26                                8 Claims

ABSTRACT OF THE DISCLOSURE

A temperature control system for heating and cooling apparatus and including a temperature sensitive bridge circuit which becomes unbalanced in response to environmental temperature change, the bridge circuit including a pair of impedances connected in series with a voltage source and a temperature change apparatus, the system being operative to apply substantially all of the source voltage to the temperature change apparatus when the bridge becomes unbalanced, the unbalanced triggering a rectifier which shorts out one impedance, and the triggering of the rectifier operating a switching means which shorts out the other impedance.

CROSS-REFERENCES TO RELATED
APPLICATION

This application is a divisional of my copending United States patent application Ser. No. 688,772, filed Dec. 7, 1967, and entitled, Bridge Circuit Temperature Control System, and the benefit of the filing date thereof is claimed for this application.

The present invention is related to the subject matter disclosed in my copending United States patent application Ser. No. 637,490, filed May 10, 1967, and now abandoned, and entitled, Temperature Control System, and which is directed generally to a novel temperature control circuit employing a controlled rectifier to regulate the operation of a controlled heat source. Since the power supply for each of the exemplary embodiments disclosed in the above-identified patent application is a center tapped transformer secondary winding, there are necessarily three wires extending between the controlled heat source transformer area and the temperature control station or wall thermostat. The transformer and the controlled heat source, which may be a furnace, an air conditioning unit, or both, are usually located remotely of the wall thermostat, with the connecting wires extending through the building walls. It is characteristic of such a three-wire, center-tapped transformer system that only half of the transformer secondary voltage can be applied to the temperature change apparatus.

BACKGROUND OF THE INVENTION

Field of invention

The present invention relates to a temperature control system of the type which can be adjusted to select a desired environmental temperature, and which is responsive to a differential between the selected temperature and the actual environmental temperature to actuate a furnace, air conditioning unit, or other temperature change apparatus and continue operation of such apparatus until the selected environmental temperature is reached.

Description of the prior art

The operation of the usual temperature control system is regulated by a sensor which monitors the temperature in the environment to be controlled by the temperature change apparatus. When the temperature changes from a predetermined, desired level, the sensor actuates a temperature control circuit to effect operation of the temperature change apparatus. After the temperature change apparatus has brought the environmental temperature back to the desired or preset level, the sensor responds by effecting deactuation of the temperature change apparatus.

Recent temperature control systems, as exemplified by the systems disclosed in my above-identified patent application S.N. 637,490, utilize so-called "solid state" sensors and switches in place of the prior art bimetallic strip switches which are characterized by physical movement in response to temperature change to mechanically make and break electrical circuit connections. Solid state components such as thermistor sensors and controlled rectifier and transistor switches respond much more rapidly and accurately to temperature changes, and have a comparatively long and trouble-free service life. However, many of the present temperature control systems utilizing solid state components require three or more wires to connect the wall thermostat to the power source and temperature change apparatus. It is most desirable to minimize the number of such connecting wires since it has been found that the greater the number of wires, the greater the likelihood that the installer will make improper wiring connections.

Prior art solid state temperature control systems deriving their power from a center-tapped transformer secondary winding are deficient in other respects. More particularly, they are characteristically incapable of applying all of the transformer secondary voltage to the temperature change apparatus. That is, such systems generally contemplate control of both heating and cooling functions, and the control circuit is arranged so that one-half of the transformer secondary voltage is available for actuation of the heating furnace and the other half is available for actuation of the air conditioning unit, the system merely selecting one-half or the other of the transformer secondary, according to whether heating or cooling is called for. In contrast, application of the full transformer secondary voltage to the temperature change apparatus would have the desirable effect of causing a more rapid response of such apparatus to heating and cooling demands of the control circuit.

Prior art systems capable of applying full voltage across the lead have either used two sensors, one for heating and the other for cooling, with the resultant possibility of simultaneously operating heating and cooling, or have been incapable of automatic changeover between heating and cooling.

Three-wire temperature control systems of the prior art are also not "fail-safe" in operation. For example, disconnection or accidental severing of the electrical leads or wires connecting the control circuit to the heating furnace sometimes has the undesirable effect of turning on the air conditioning unit, and vice versa. That is, the function located in the unbroken circuit is turned on.

SUMMARY OF THE INVENTION

The present invention relates to a temperature control system of the normally-balanced bridge type which becomes unbalanced in response to departure of the actual environmental temperature from a desired environmental temperature selected by adjustment of a temperature selection means in the bridge circuit. The bridge circuit includes a pair of impedances connected in series with the voltage source and a temperature change apparatus, the system being operative to apply substantially all of the supply voltage to the temperature change apparatus by operation of a rectifier triggered by unbalance of the bridge. Rectifier triggering shorts out one impedance, and the second impedance is shorted out by a switching means operative in response to triggering of the rectifier. The full transformer secondary voltage is then applied to the temperature change apparatus through a two wire circuit between the temperature change apparatus and the temperature control system, thus obtining more rapid and responsive operation of such apparatus, and with fewer wires compared to existing center-tapped transformer systems.

The connection of the bridge circuit to the voltage source and temperature change apparatus by only two wires greatly simplifies system installation in residences and the like. Moreover, disconnection or severance of either of the two wires results in a fail-safe condition, the system simply becoming inoperable, with no portion of the system continuing to operate in an uncontrolled manner.

The present temperature control system is adapted to incorporate many of the refinements or sophistications of existing solid-state circuits, such as manual changeover between heating and cooling functions; automatic changeover between heating and cooling functions; feed-back heating of the temperature sensitive portion of the bridge circuit to shorten the duration of operation of the temperature change apparatus and thereby avoid "over shoot"; and incorporation in the control circuit of the heating and cooling loads in series or in parallel, as desired.

The foregoing as well as other objects and advantages of the present invention may be more clearly understood by reference to the following detailed description, when considered with the drawings which illustrate particular temperature control systems according to the present invention.

DESCRIPTION OF THE PREFERRED EMBODIMENTS

Figure 1:
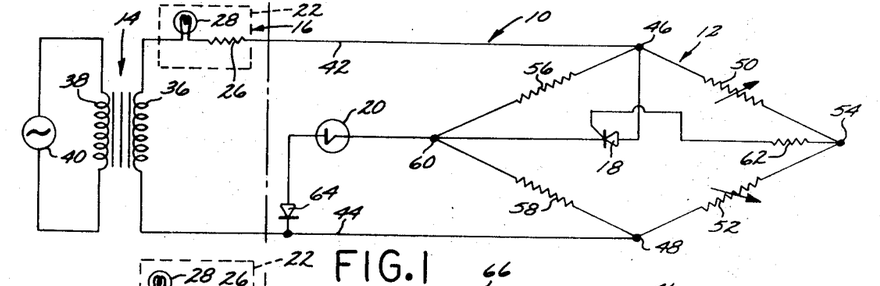
FIG. 1 is a wiring diagram of a basic form of temperature control system according to the present invention, the system providing a heating only function.

Referring now to the drawings and particularly to FIG. 1, there is illustrated a temperature control system 10 according to the present invention which comprises, generally: an alternating current bridge circuit 12 adapted for connection to a source 14 of alternating current which is in series with an environmental temperature change apparatus such as a heating source 22, a cooling source 24, or a combination of both; and a controlled rectifier 18 together with a switching means such as a switching diode 20 are connected to the bridge circuit 12.

In general, system 10 operates by virtue of the temperature sensitivity of the bridge circuit 12 and its capacity to achieve a balanced condition at such time as the environmental temperature substantially coincides with a selected environmental temperature to which the bridge circuit is preset. More particularly, when the bridge circuit 12 is balanced, the rectifier 18 and switching diode 20 are nonconductive, and the temperature change apparatus 16 is not energized. However, when a differential develops between the actual and the preset environmental temperatures, the bridge circuit is unbalanced and the rectifier 18 is triggered or fired. This in turn actuates the switching diode 20, which results in application of substantially the full voltage of the source 14 to the temperature change apparatus 16. This either heats or cools the environment, depending upon the type of temperature change apparatus used and the nature of the bridge unbalance, the heating or cooling continuing until the changed environment sensed by the bridge circuit 12 is such that the circuit is rebalanced.

As previously mentioned, the temperature change apparatus may be the heating furnace or heating source 22, an air conditioning unit or cooling source 24, or a combination of the two. The heating and cooling sources 22 and 24 are diagrammatically indicated in FIGS. 1 and 2, respectively, the heating sources in FIGS. 1 and 2 both being designated 22 because of their identical operation, even though the source 22 in FIG. 2 includes a conventional diode 30. More particularly, the heating source 22 includes a heating impedance or resistor 26 of relatively low resistance for power dissipation, a ballast lamp 28 connected in series with the resistor 26 and, in FIG. 2, the diode 30, which is connected in parallel with the heating resistor 26.

The heating source 22 is shown diagrammatically since it can be any one of many typical heating furnaces. The heating resistor 22 is representative of the impedance load or element which controls the operation of most such furnaces. For example, in my copending patent application Ser. No. 637,490, a furnace is described which includes a movable bimetallic switch arm located immediately adjacent a resistor like the resistor 26. The arm is normally biased toward an open circuit position, but when sufficient current and voltage is applied to the resistor 26, the heating of the resistor heats the adjacent bimetallic switch arm. This bends the switch arm and closes the associated circuit which causes operation of the heating furnace, as is well known to those skilled in the art.

It should be noted that sufficient heat must be developed in the heating resistor 26 to cause bending of the bimetallic switch arm against its associated contact. Therefore, a threshold level of current and voltage must be exceeded in order to initiate operation of the heating furnace. Once this threshold is attained, however, the momentary interruption of current flow during alternate halves of an alternating current signal is not sufficient to halt operation of the heating source 22. Consequently, the heating source 22 is operable by the alternate halves of the a-c current from the power source 14. In this regard, the higher the voltage level applied to the resistor 26, the more rapid will be the "turn-on" of the heating source 22, which is desirable for rapid response to heating demands.

The ballast lamp 28 of the heating source 22 is provided to limit the power level in the circuit and prevent overheating of the circuit and its components, the lamp 28 constituting a variable impedance having a positive temperature coefficient of impedance to dissipate excess energy.

Figure 2:
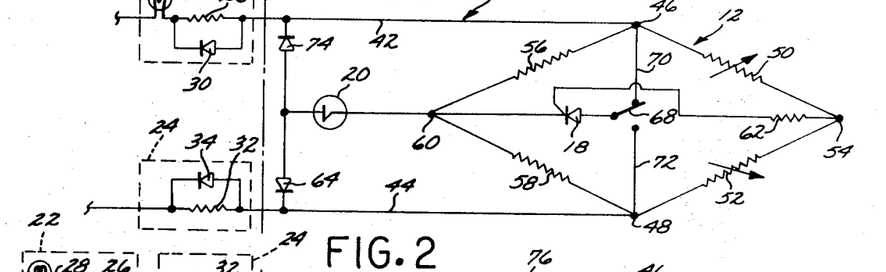
FIG. 2 is a wiring diagram of the system of FIG. 1, modified to provide both heating and cooling functions with manual changeover.

The cooling source 24 shown in FIG. 2 includes a cooling impedance or resistor 32 which is connected in parallel with a diode 34. The operation of the air conditioning unit (not shown) or cooling source 24 associated with the cooling resistor 32 can be effected in a manner similar to the actuation of the heating furnace associated with the heating resistor 26. However, it will be understood that the particular form of heating or cooling apparatus associated with the heating resistor 26 or cooling resistor 32 is not important to the present invention. Regardless of the nature of such sources, the temperature control system 10 is effective upon unbalance of the bridge circuit 12 to apply a level of current and voltage to some form of impedance in the circuit to thereby operate such source, and the manner in which energization of such impedance is translated into actuation of an associated heating or cooling unit is immaterial to the invention.

Referring again to FIG. 1, the power source 14 preferably takes the form of a secondary winding 36 of a voltage step-down transformer whose primary winding 38 is connected in series with an A-C source 40. The source 40 may be a conventional 110-volt, 60-cycle source.

The secondary winding 36 is connected in series with the heating source 22, and these in turn are series connected by two legs or wires 42 and 44 to a pair of opposed nodes 46 and 48 of the four-leg bridge circuit 12. One leg of the bridge circuit 12 connected to the node 46 includes a temperature selection impedance or potentiometer 50, while the corresponding leg connected to the node 48 includes a temperature sensitive variable impedance or thermistor 52 having a negative temperature coefficient of impedance variation. The potentiometer 50 and thermistor 52 join at a node 54 of the bridge circuit 12. The impedances of the potentiometer 50 and the thermistor 52 are approximately equal and relatively high, each being in the order of approximately 20,000 ohms. These values, like other values referred to herein are merely exemplary to afford a measure of general relevance between the various components of the system 10.

The high impedances of the potentiometer 50 and the thermistor 52 relative to that of the heating resistor 26, which is in the order of less than 100 ohms, render negligible bridge currents flowing through the bridge circuit when it is in balance. Consequently, the relatively low level of such currents is inadequate to heat the heating resistor 26 sufficiently to actuate the heating source 22.

The remaining two legs of the bridge include, respectively, a pair of impedances or resistors 56 and 58 having approximately equal and relatively high impedances, each being in the order of 15,000 ohms, and thereby effectively preventing sufficient current from passing through them to actuate the heating source 22 or, as will be seen, the cooling source 24.

The resistors 56 and 58 have a common junction at a node 60 of the bridge circuti 12 and their opposite ends at the nodes 46 and 48 are connected across the transformer winding 36 and in series with the heating source 22 by the pair of wires 42 and 44. Each of the resistors 56 and 58 must therefore be bypassed or shorted out to permit sufficient current and heat to be applied to the heating resistor 26 to actuate the heating source 22.

The resistor 56 is shorted out upon triggering of the rectifier 18. In this regard, the rectifier 18 is of the typical controlled rectifier type and has its anode connected to the node 46, its cathode connected to the node 60, and its control or gate electrode connected through a protective or current limiting resistor 62 to the node 54. The resistor 62 is of relatively low impedance, such as approximately 500 ohms, compared to the relatively high impedances of the potentiometer 50 and the thermistor 52.

As more particularly described in my copending patent application Ser. No. 637,490, the rectifier 18 is a solid state switch conductive in only one direction and triggered when its anode is positive relative to its cathode, that is, when the rectifier is forwardly biased. Once forwardly biased, a voltage applied to the rectifier gate electrode in excess of the predetermined triggering or gating voltage will cause the rectifier 18 to fire. This passes current from its anode to its cathode, thereby short circuiting the resistor 56. Since rectifier triggering requires that the rectifier be forwardly biased, triggering in the system 10 occurs only during a positive-going half cycle of the alternating current signal applied across the anode and cathode. The rectifier 18 is reverse-biased during the negative-going half cycle, the cathode being positive relative to the anode, and the resulting impedance presented by the rectifier 18 is so high that the rectifier becomes non-conductive. In this regard, the terms positive-going and negative-going refer to the wave forms of the A-C signal applied to the rectifier 18, and do not refer to the potentials developed by the A-C signal across the rectifier 18.

Assuming that the rectifier 18 has been triggered, shorting out the resistor 56, the other resistor 58 still presents a sufficiently high impedance to current flow that the heating resistor 26 is not heated enough to actuate the heating source 22. Shorting out of this remaining resistor 58 is the function of the switching diode 20. More particularly, the switching diode 20, which is sometimes referred to as a four layer Shockley diode, is characterized by high resistance to current flow until subjected to a voltage in excess of a particular threshold or switching voltage. This level of voltage is effective to switch the diode and cause it to fully conduct, passing current through the switching diode 20, and through a diode 64 which blocks or protects the diode 20 from the flow of any current in the nonswitching direction. This switching action short circuits the resistor 58 so that full line voltage is applied to the heating resistor 26 to actuate the heating source 22. A switching diode 20 is selected such that its switching voltage is in excess of the normal voltage across the resistor 58 when the bridge circuit 12 is balanced. This prevents current flow through the diode 20 in the absence of rectifier triggering.

Summarizing operation of the temperature control system 10 illustrated in FIG. 1, a decrease in the environmental temperature surrounding the thermistor 52, or a manual adjustment of the potentiometer 50 to decrease its impedance, unbalances the bridge circuit 12, the voltage across the thermistor 52 being greater than the voltage across the potentiometer 50. Accordingly, during each positive-going half cycle when the rectifier 18 is forward biased, the rectifier 18 is triggered when the voltage resulting from bridge unbalance exceeds the rectifier gating voltage. To be accurate, the unbalance voltage must exceed the gating voltage plus the voltage drop across the gating resistor 62, but for brevity only the bridge unbalance voltage and gating voltage are generally referred to in this discussion of rectifier triggering.

Continuing with the summary of operation, rectifier triggering shorts out the resistor 56, and essentially full transformer secondary voltage is applied to the parallel connection of the switching diode 20 and the resistor 58. Since this voltage is higher than the switching voltage of the switching diode 20, the diode 20 switches on and effects application of essentally the full transformer secondary voltage across the heating resistor 26 to actuate the heating source 22. This process is repeated every positive-going half cycle as long as sufficient gating voltage is applied to the rectifier 18 by the bridge circuit 12. The consequent heating of the environment by the heating source 22 also gradually raises the temperature of the thermistor 52 until its impedance drops enough to rebalance the bridge circuit 12, that is, the bridge unbalance voltage falls below the rectifier gating voltage.

With the above arrangement, only two wires 42 and 44 need extend from the wall thermostat in which the bridge circuit 12 is located to the area in which the transformer and heating source 22 are located. This significantly simplifies installation of the temperature control system 10. In addition, if any break occurs in the lines 42 and 44, the system 10 is completely shut-off, that is, there is a "fail-safe" condition.

Referring now to FIG. 2, wherein like numerals are employed to designate like components, as is also the convention used in the other figures of the drawings, a temperature control system 66 is illustrated which is substantially similar to the system 10 of FIG. 1. However, the system 66 provides both heating and cooling functions with manual changeover.

The cooling resistor 32 may be, for example, assocated with a relay (not shown) for actuating an air conditioning or refrigeration unit (not shown) comprising the cooling source 24. For this purpose the resistor 32 is located in the line 44 on the side of the transformer secondary winding opposite the location of the heating source 22. Diodes 30 and 34 are connected in parallel with the heating resistor 26 and the cooling resistor 32, respectively, to allow current to be bypassed during the half cycle utilized for actuation of the opposite function, cooling source 24 or heating source 22, as the case may be.

A system selector switch 68 is coupled to the anode of the rectifier 18 and can be manually moved for coupling to the anode 46 through a lead 70, or to the ande 48 through a lead 72. This enables the rectifier anode to be connected to either side of the transformer secondary winding 36 to select which half cycle will forwardly bias the rectifier 18, and thereby determine whether the heating source 22 or the cooling source 24 will be actuated. An additional directional diode 74 is connected between the output of the breakdown diode 20 and the line 42. As will be seen, the diodes 64 and 74 block current on the nonselected half cycle, and allow current flow through the breakdown diode 20 on the selected half cycle.

In operation of the temperature control system 66, assume that the heating function has been selected by movement of the switch 68 to the position illustrated. The rectifier anode is thereby temporarily or switch connected to the node 46, in the same manner as the permanent rectifier anode connection of the system 10 of FIG. 1. Accordingly, only positive-going half cycles of the A-C current can forward bias the rectifier 18. Next, when an unbalance occurs in the bridge circuit requiring a rise in the environmental temperature, the rectifier 18, forwardly biased on the positive-going half cycle through the lead 70, is triggered when the bridge unbalance voltage exceeds the rectifier gating voltage. Triggering of the rectifier 18 allows current flow from the transformer secondary winding 36 through the lamp ballast 28, heating resistor 26, lead 42, lead 70, the rectifier 18 and breakdown diode 20, the diodes 64 and 34, and back to the transformer secondary winding 36. This actuates the heating source 22, which continues to operate until an environmental temperature is reached which rebalances the bridge circuit.

If the system selector switch 68 is thrown to the position opposite that illustrated, the rectifier 18 will be forward-biased through the lead 72 upon negative-going half cycles of the alternating current signal. Then, when the temperature rises sufficiently to unbalance the bridge circuit 12, for example, the rectifier 18 will be triggered when the unbalance voltage exceeds the rectifier gating voltage during the negative-going half cycles. This is followed by switching of the switching diode 20, permitting current flow from the transformer secondary winding 36, through the cooling resistor 32, the lead 72, the rectifier 18, the switching diode 20, the diodes 74 and 30, and back to the transformer secondary winding 36. Operation of the actuated cooling source 24 continues until an environmental temperature is reached which rebalances the bridge circuit.

Figure 3:
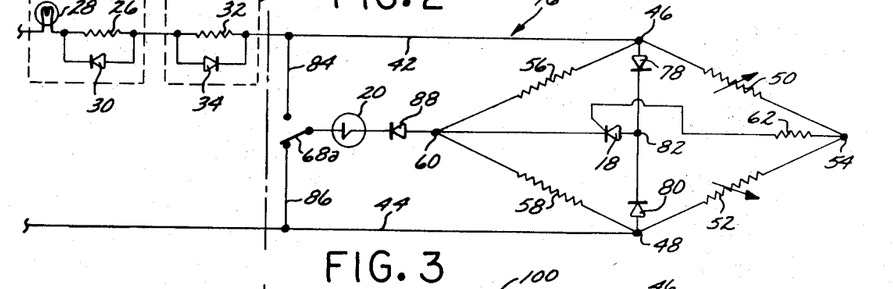
FIG. 3 is a wiring diagram of a temperature control system similar to that of FIG. 2, but with the heating and cooling portions of the circuit connected in series on the same side of the transformer secondary winding.

In FIG. 3 is illustrated a temperature control system 76 which is an alternative to the system 66 of FIG. 2, also providing heating and cooling functions with manual changeover. In the system 76, the anodes of a pair of director diodes 78 and 80 are connected to the nodes 46 and 48, respectively, and the cathodes thereof are connected to the anode of the rectifier 18 at a junction 82.

A manual system selector switch 68a is connected to the cathode of the switching diode 20, and is movable between a pair of positions coupling the diode 20 to opposite sides of the transformer winding 36 through leads 84 and 86, respectively. In addition, a diode 88 is interposed between the switching diode 20 and the bridge node 60 to block current from the diode 88 in the nonswitching direction.

The heating and cooling sources 22 and 24 are located on the same side of the transformer, with the bypass diode 34 of the cooling source 24 therefore being reversed in orientation compared to its orientation in the system 66 of FIG. 2.

The director diodes 78 and 80 provide a means for forwarding biasing the rectifier 18 during both halves of each A-C cycle. Accordingly, the rectifier 18 can be triggered during either the positive or negative-going half cycles of the alternating current signal to thereby actuate one or the other of the heating and cooling sources 22 and 24. More particularly, assuming that the system selector switch 68a is in the position illustrated in FIG. 3, and further assuming that the environmental temperature drops so that the impedance presented by the thermistor 52 increases, the bridge circuit becomes unbalanced, with the voltage across the thermistor 52 being greater than the voltage across the potentiometer 50. Consequently, during a positive-going half cycle the forwardly biased rectifier 18 is triggered when the higher voltage at node 54 compared to node 60 exceeds the rectifier gating voltage. On rectifier triggering, current flow through the ballast lamp 28, the heating resistor 26, the director diodes 34 and 78, the triggered rectifier 18, the blocking diode 88, the switched switching diode 20, the leads 86 and back to the transformer secondary winding 36.

Manually moving the system selector switch 68a to a position opposite that illustrated, permits actuation of only the cooling source 24. More particularly, when the environmental temperature rises to a point which reduces the impedance of the thermistor 52 sufficiently to unbalance the bridge circuit and trigger the rectifier 18, current passes through the lead 44, the director diode 80, the rectifier 18, the diode 88, the switching diode 20, the lead 84, the cooling resistor 32, the bypass diode 30, the ballast lamp 28, and back to the transformer secondary winding 36. The actuated cooling source 24 continues to operate, because of energization of the cooling resistor 32 during negative-going half cycles, until the environmental temperature is reduced sufficiently to effect rebalance of the bridge circuit.

Figure 4:
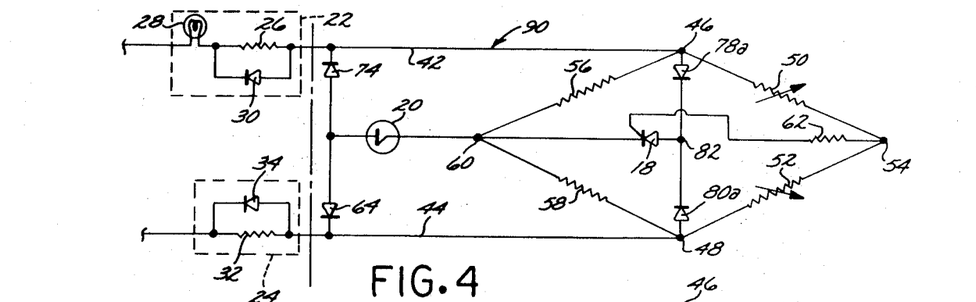
FIG. 4 is a wiring diagram of the system of FIG. 1, modified to provide both heating and cooling functions with automatic changeover.

Referring now to FIG. 4, there is illustrated a temperature control system 90 which is identical to the system 66 of FIG. 2, except that the system selector switch 68 is replaced by a pair of director diodes 78a and 80a having their anodes connected to the nodes 46 and 48, and their cathodes connected to the rectifier anode at the junction 82. The director diodes 78a and 80a provide an automatic changeover between heating and cooling functions and operate in a manner identical to that just described in connection with the director diodes 78 and 80 of the system 76 of FIG. 3. That is, the diodes 78a and 80a operate to forward bias the rectifier 18 during the positive and negative-going half cycles of the applied signal, respectively.

The operation of the system 90 of FIG. 4 is completely automatic. More particularly, assuming that the bridge unbalance calls for heat, that is, the impedance across the potentiometer 50 decreases or the impedance across the thermistor increases, the rectifier 18 will be triggered when the unbalance reaches a level exceeding the rectifier gating voltage and at a time when the rectifier 18 is forwardly biased. Forward biasing occurs during each positive-going half cycle, and triggering on each such half cycle continues until the bridge unbalance voltage drops below the rectifier gating voltage.

On rectifier triggering, current passes through the heating resistor 26, the direct diode 78a, the triggered rectifier 18, the switched breakdown diode 20, the director and bypass diodes 64 and 34, and back to the transformer secondary winding 36.

In contrast, when the environmental temperature rises sufficiently that the reduced impedance of the thermistor 52 produces a bridge unbalance voltage exceeding the rectifier gating voltage, the rectifier 18 will be triggered on a negative-going half cycle, permitting current flow through the cooling resistor 32, the director diode 80a, the rectifier 18, the switching diode 20, the director and bypass diodes 74 and 30, the ballast lamp 28, and back to the transformer secondary winding 36.

It is a salient feature of each of the temperature control systems thus far described that when the rectifier 18 is triggered and the switching diode 20 is switched, thereby applying line voltage to the particular temperature change apparatus concerned, the voltage across the thermistor 52 approaches zero. The loss in current through the thermistor during the period of conduction through the rectifier 18 and the switching diode 20 very greatly reduces self-heating of the thermistor 52, that is, the self-heating of the thermistor which occurs by virtue of even the small current flow passing through the thermistor during bridge balance conditions.

The reduction in self-heating on rectifier triggering causes the thermistor 52 to operate cooler during operation of the associated temperature control system. This is desirable in that when the temperature control system calls for heat, the drop in temperature of the thermistor occurring upon triggering of the rectifier 18 causes the bridge circuit to further unbalance in the direction of heating, which causes the rectifier 18 to fire early during each positive-going half cycle. The heating source 22, therefore, rapidly switches to a state of operation to provide maximum heating for the surrounding environment to more rapidly bring the bridge circuit to a balanced condition and the environment to the desired temperature. A relatively short heating cycle results, which substantially reduces the time required for the heating source 22 to turn on after the initial call for heat.

An opposite result is produced when the cooling source 24 is called into operation upon an unbalance of the bridge circuit calling for a lowering of the environmental temperature. Under such conditions, the reduced self-heating of the thermistor 52 results in a longer cooling cycle, the loss in self-heating of the thermistor looking to the temperature control system like a rebalance of the bridge circuit, and the rectifier 18 becomes nonconducting. The result is a series of comparatively short but increasingly longer "on" times. The time integral of these "on" times causes the cooling source to turn on.

The amount of unbalance necessary in the bridge circuit to operate the cooling source 24 is thus greater than that required for operation of the heating source 22. A greater change in bridge balance is required to operate the cooling source as compared to the heating source. In summary, the loss in self-heating of the thermistor 52 results in a greater difference in turn-on and turn-off temperature for cooling as compared to heating, thus extending the overall time for a cooling operation. A relatively long turn-on time for cooling is desired since cooling equipment is sometimes damaged by short on-and-off cycles.

The just described heating differential can be further reduced, the cooling differential further increased, or the heating and cooling differentials otherwise altered by incorporating in the various temperature control systems described some form of feedback arrangement. Various types of feedback arrangement are illustrated in FIGS. 7A through 7D.

More particularly, in order to slowly counteract the loss in self-heating of the thermistor 52 and thereby prevent system "overshoot" after the desirably rapid turn-on of the heating source 22 has occurred after a heating demand, a relatively large mass resistor 92, as compared to the mass of the thermistor 52, is electrically interposed in the anode circuit of the rectifier 18 and is positioned closely adjacent the thermistor 52 in thermally coupled relation so as to raise the temperature of the thermistor 52 subsequent to flow of current through the rectifier anode circuit.

The relatively large mass of the feedback resistor 92 causes it to raise in temperature comparatively slowly, and thereby slowly raise the temperature of the thermistor 52 to gradually compensate for the thermistor self-heating loss. As a consequence of this thermal interaction, the environmental temperature rise required to achieve balance of the bridge circuit is reduced, thus decreasing the operating temperature differential for a heating operation. Accordingly, the bridge circuit returns to balance slightly prior to the time that it otherwise would because of the increasing environmental temperature. This prevents the heating source 22 from overshooting the preset temperature desired, since residual heat in the source 22 will still be circulated after the bridge circuit is balanced.

During a cooling demand, the effect of the feedback resistor 92 is to require a further reduction in environmental temperature to compensate for the heating effect of the feedback resistor 92, thereby further increasing the operating temperature differential for cooling. In effect, the resistor 92 is telling the thermistor 52 that the environmental temperature is higher than it really is, thereby desirably prolonging the cooling cycles of the cooling source 24. Since these feedback effects are desirable during both the heating and the cooling operations, one feedback resistor 92 can be used for both such operations.

Figure 7A:
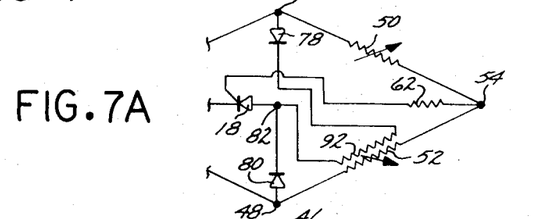
FIG. 7A is a partial wiring diagram illustrating a feed-back arrangement for a heating only function.

Use of the feedback resistor 92 for a heating only compensation is illustrated in FIG. 7A. The resistor 92 is connected between the cathode of the director diode 78 and the anode of the rectifier 18, thereby operating only during operation of the heating source 22.

Figure 7B:
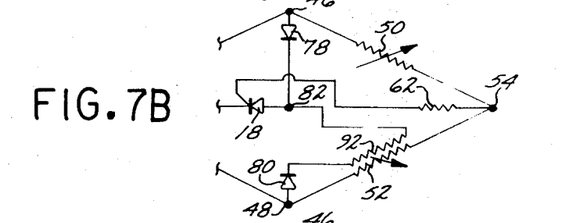
FIG. 7B is a partial wiring diagram illustrating a feed-back arrangement for a cooling only function.

In FIG. 7B, the resistor 92 is illustrated as connected between the cathode of the director diode 80 and the anode of the rectifier 18 so that the resistor 92 provides a feedback function only on operation of the cooling source 24.

Figure 7C:
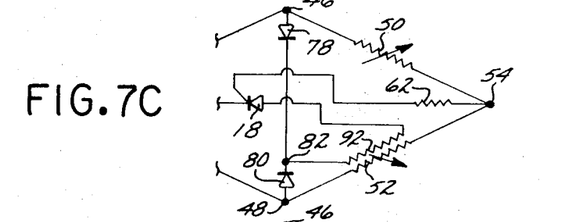
FIG. 7C is a partial wiring diagram illustrating a feed-back arrangement for both heating and cooling functions.

FIG. 7C illustrates the feedback resistor 92 located between the anode of the rectifier 18 and the junction 82 of the cathodes of the director diodes 78 and 80 so that the feedback function of the resistor 92 is provided during operation of both the heating and cooling sources 22 and 24.

Figure 7D:
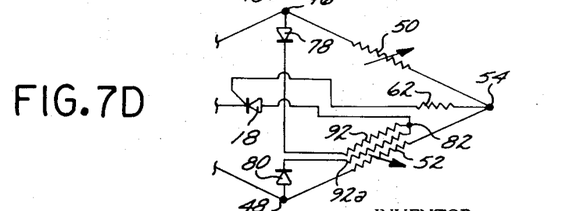
FIG. 7D is a partial wiring diagram illustrating a dual feedback arrangement providing different compensations for the heating and cooling functions.

FIG. 7D illustrates the employment of the feedback resistor 92 together with a similar feedback resistor 92a. Both of the resistors are located in thermally coupled relation to the thermistor 52. The thermistor 92 is connected between the cathode of the director diode 78 and the anode of the rectifier 18 to provide a feedback function during operation of the heating source 22, whereas the feedback resistor 92a is located between the cathode of the director diode 80 and the anode of the rectifier 18 to provide a feedback function during operation of the cooling source 24. With this arrangement, the temperature rise characteristics of the feedback resistors 92 and 92a can be tailored to the particular needs of the separate heating and cooling functions.

Figure 5:
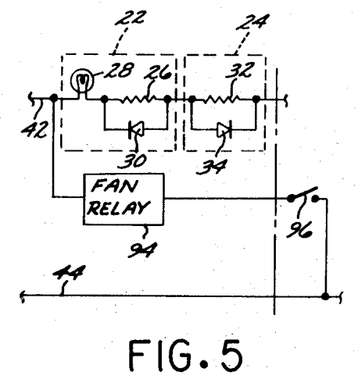
FIG. 5 is a wiring diagram of a temperature control system similar to that of FIG. 4, but illustrating incorporation of a fan switch in the system, and illustrating location of both the heating and cooling portions of the circuit on the same side of the transformer secondary winding.

In FIG. 5 there is illustrated a portion of a heating and cooling system with automatic changeover, the heating and cooling sources 22 and 24 being connected in series, as in the temperature control system 76 of FIG. 3. The showing in FIG. 5 discloses the manner in which a fan relay 94 can be connected across the transformer secondary winding 36, and in series with a fan switch 96, so that closure of the fan switch 96 at any time will energize the fan relay 94 and thereby operate the associated fan (not shown) whenever desired. The fan can be operated notwithstanding operation or nonoperation of either or both of the heating and cooling sources 22 and 24.

Figure 6:
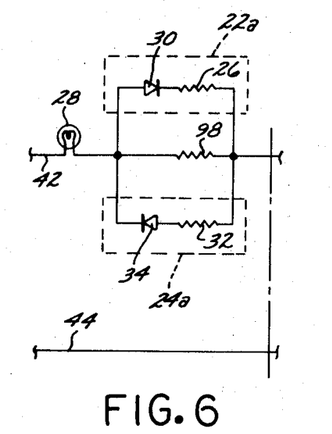
FIG. 6 is a wiring diagram of a temperature control system similar to that of FIG. 3, but illustrating the heating and cooling portions of the circuit connected in parallel and on the same side of the transformer secondary winding.

In FIG. 6 there is illustrated a variation of the heating and cooling system 76 of FIG. 3 which is characterized by automatic changeover capability. In the system of FIG. 6 the ballast lamp 28 is located in the lead 42 and in series with an impedance or resistor 98 which is comparatively large, in the order of 3,000 ohms, connected in parallel with a heating source 22a and a cooling source 24a.

Each of the sources 22a and 24a includes a director diode connected in series with a resistor, the diode of the heating source 22a blocking negative-going half cycles of the A-C signal, while the diode of the cooling source 24a is oppositely directed to block positive-going half cycles of the A-C signal.

Each of the heating and cooling loads, that is, each of the resistors of the sources 22a and 24a is normally less than 100 ohms. With this arrangement, should either or both of the sources 22a and 24a be disconnected from the line 42, the presence of the resistor 98 enables the associated temperature control system to continue to receive sufficient power to maintain the thermistor 52 thereof in a normal self-heated state and the bridge circuit in balance. In this condition of the bridge circuit, and particularly the thermistor 52 thereof, either one or both of the sources 22a and 24a can be dropped from or added to the circuit without upsetting the balance of the bridge. This contrasts with the temperature control systems previously described. In these other systems if the heating or cooling sources 22 or 24 are disconnected, the associated thermistor 52 loses its self-heating because of the lack of energization of the bridge circuit. Consequently, reconnection of one or the other of the sources 22 or 24 would then re-energize the bridge circuit, and the ensuing initial lack of heat in the thermistor 52 would cause actuation of one or the other of the sources 22 and 24 even though the environmental temperature did not require it. Operation of the actuated source 22 or 24 would then undesirably continue until the thermistor 52 had heated sufficiently by self-heating to properly affect the associated bridge circuit and balance it.

In contrast, the system of FIG. 6 is particularly advantageous in that, for example, addition of a cooling source 24a can be made to an original instllation of a heating source 22a without such difficulty. Moreover, both sources 22a and 24a function normally with the resistor 98 connected in parallel as shown, the associated temperature control system being characterized by automatic changeover from the heating source 22a to the cooling source 24a, and vice versa, in the manner previously described in connection with the system 76 of FIG. 3.

Figure 8:
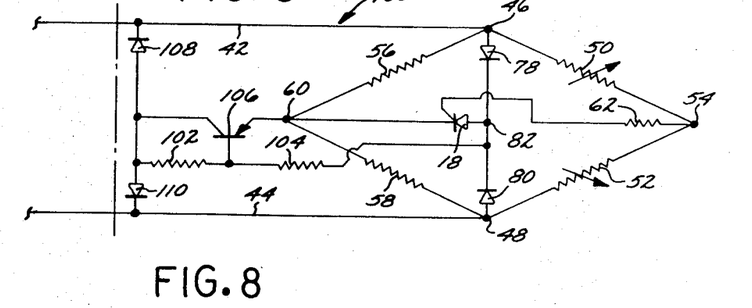
FIG. 8 is a wiring diagram of a temperature control system similar to that of FIG. 3, but utilizing a different form of switching means responsive to the triggering of the controlled rectifier.

Referring now to FIG. 8, there is illustrated a temperature control system 100 having a bridge circuit and rectifier arrangement also identical to the system 76 of FIG. 3. However, instead of the switching diode 20 of the system 76, the system 100 utilizes a different and somewhat less expensive form of switching means. This switching means provides the same result as the switching diode 20 and comprises a voltage divider having a pair of resistors 102 and 104, and a conventional transistor "switch" 106 whose conductivity is controlled by the voltage divider.

More particularly, the junction of the series connected resistors 102 and 104 is connected to the base of the transistor switch 106. The opposite end of the resistor 104 is connected to the junction of the cathodes of the director diodes 78 and 80 in the anode circuit of the rectifier 18 so that the resistor 104 is in parallel with the series coupled emitter and rectifier anode-cathode circuit. The opposite end of the resistor 102 is connected to the junction of the anodes of a pair of diodes 108 and 110 so that the resistor 104 is in parallel with the collector of the transistor switch 106, which is similarly connected between the anodes of the diodes 108 and 110. The cathodes of the diodes 108 and 110 are connected across the transformer secondary winding 36 to the leads 42 and 44, respectively.

In operation of the system 100, the rectifier 18 is non-conducting when the bridge circuit is balanced, the emitter of the transistor switch 106 at this time being approximately at mid-voltage relative to the voltage drop across the leads 42 and 44. This is true for both heating and cooling cycles and is the result of the substantially equal impedances of the pair of resistors 56 and 58 in the bridge circuit. In addition, the emitter and base of the transistor switch 106 are at appoximately the same voltage level so that the transistor switch 106 is characteristically open circuit or nonconducting. This base bias voltage is achieved by selecting a resistor 104 of a value providing a voltage drop approximating that across the resistor 56, during a heating cycle, or across the resistor 58, during a cooling cycle.

Assuming an unbalance in the bridge calling for heat, and which is sufficiently great that the voltage unbalance exceeds the rectifier gating voltage, the forwardly biased rectifier 18 is triggered during the positive-going half cycles of current. This shorts out the resistor 56 and the transistor switch emitter then drops to the voltage of the line 42. In contrast, the voltage at the switch base is relatively unchanged and constitutes a bias which is in excess of the threshold or switching voltage necessary to switch on the transistor switch 106, that is, render it conducting.

Once the transistor switch 106 is conducting, the bridge resistor 58 is shorted out. More particularly, and with reference to both FIGS. 2 and 8, current flows through the lamp ballast 28, the heating source resistor 26, the director diodes 78, the rectifier 18, the transistor switch 106, the director diodes 110 and 34, and back to the transformer secondary winding 36.

When the bridge circuit becomes unbalanced by a rise in environmental temperature sufficient to create cooling demand which triggers the rectifier 18, the current flow is through the cooling resistor 32 of the cooling source 24, the line 44, the director diode 80, the triggered rectifier 18, and to the emitter of the transistor switch 106. Again, the transistor base is at a voltage level between that of the lines 42 and 44, and the triggered rectifier drops the voltage level of the transistor emitter to that of the line 24, This biases the transistor switch 106 sufficiently above its switching voltage that the switch 106 becomes conducting. The resistor 58 is then shorted out. The current flow from the rectifier 18 is thus through the transistor switch 106, the diodes 108 and 30, the ballast lamp 28, and back to the transformer secondary winding 36.

In the various temperature control systems heretofore described, certain terms have been used which perhaps need further explanation. For example, the term "rectifier" is intended to include any device which blocks current in one direction, is normally nonconducting, and is rendered conductive by a gating signal in excess of a predetermined current level. Such a device is current sensitive, for triggering, as compared to the switching diode 20, which is voltage sensitive for triggering.

A suitable form of switching diode 20 is a PNPN four layer switching diode characterized by a predetermined blocking, switching, or triggering voltage at which it switches from nonconducting state to a substantially fully conducting state, that is, a state in which there is, in effect a short across the device. In addition, once triggered, the device requires a negligible holding current to maintain it in a conducting state.

The feedback resistor in the systems herein described, such as the resistor 92 of FIG. 7A, need not be in the anode circuit of the rectifier 18, as illustrated. It may be anywhere in the circuit which carries the current which passes after the rectifier 18 is triggered and the associated diode 20 or switch 106 is operated, as will be apparent.

An additional advantage of the characteristic loss of self-heating of the thermistor 52 is apparent when the so-called "droop" of prior art temperature control system are considered. By "droop" is meant the difference in the regulated temperature of the room under heavy load conditions compred to light load conditions.

More particularly, in the usual prior art system the undesirable over-shoot of the system is reduced by introducing, on heating turn-on, a relative small amount of heat, sometimes referred to as "anticipation heat." At low loads this has the effect of turning the heat off slightly earlier than would otherwise be the case, thereby preventing over-shoot. However, under heavy load conditions application of anticipation heat to the inside of the thermostat body for long periods of time results in a gradual temperature increase in the thermostat itself, the increased temperature sometimes being in excess of the room temperature to which the thermostat is set. This means that the thermostat will be inaccurate in that the room temperature desired will appear to have been attained when in fact it is lower than the desired temperature.

In contrast, the loss in self-heating of the thermistor 52 means that the thermistor 52 actually decreases in temperature when the heat is turned on. This decrease in temperature may amount to perhaps two degrees Fahrenheit, and is compensated for by the feedback provided by the present system. This two degree loss in self-heating, however, provides room for the anticipation heat without introducing the "droop" of the usual prior art system.

In FIGS. 9 through 12 are illustrated temperature control systems which are essentially identical to the system of FIG. 1 except that instead of the internally trigger switching diode 20, there is utilized an externally triggered controlled rectifier 112, which is identical to the rectifier 18 of the system of FIG. 1.

Figure 9:
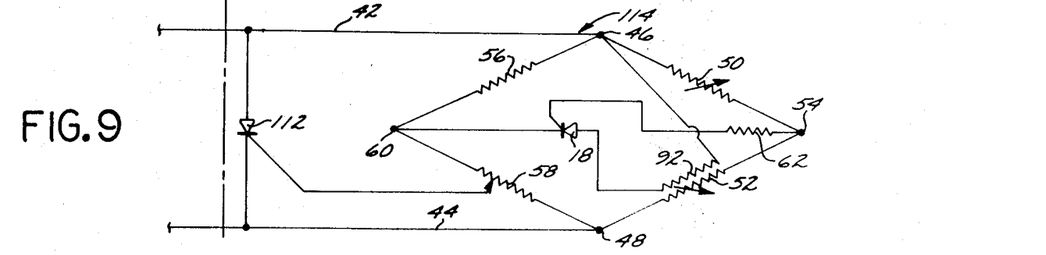
FIG. 9 is a wiring diagram of a temperature control system similar to that of FIG. 1, but utilizing a second controlled rectifier as the switching means responsive to the triggering of the first controlled rectifier, the system providing a heating only function.

With particular reference to FIG. 9, there is illustrated a temperature control system 114 which is operative to provide a heating only function. For the purpose of brevity, those elements of the systems of FIGS. 9 through 12 which are identical in construction and function to those of the above-described systems are identified by the same numerals.

The vertical dash-dot line in FIGS. 9 through 12 indicates that the portion to the left of such line can be made the same as the left-hand portion of the corresponding dash-dot line of FIGS. 1 through 6 and 8, as will be apparent.

The temperature control system 114 of FIG. 9 includes a bridge circuit identical to the bridge circuit 12 of the system of FIG. 1, except that the feedback resistor 92 is located adjacent the thermistor 52. The feedback resistor 92 is identical to that shown in FIGS. 7A through 7B, but its opposite ends are connected to the anode circuit of the rectifier 18 and to the anode circuit of the rectifier 112. The rectifier 112 has its anode lead connected to the lead 42, its cathode connected to the lead 44, and its gate connected to the resistor 58, which in this instance is constituted by a potentiometer whose resistance can be adjusted to adjust for variations in the characteristics of the particular rectifier 112 which is used. Thus, the rectifier 112 is essentially substituted for the switching diode 20 and the diode 64 of the system of FIG. 1.

With this arrangement, the rectifier 112 is used to carry all of the load current.

Operation of the system 114 is similar to that of FIG. 1 in that while the bridge circuit is balanced, the voltage between nodes 46 and 48 is divided across the resistors 56 and 58. When the bridge becomes unbalanced, as when heat is called for by the system, the rectifier 18 becomes conducting and short circuits across the resistor 56, applying the full voltage of the power source across the resistor 58. This, in effect, doubles the voltage across the resistor 58, which is adequate to trigger the rectifier 112, such initial triggering occurring at the 90-degree conduction angle point. Further unbalance can increase this conduction angle to approximately 150 degrees, if desired, which would permit utilization of the system to operate the second stage control is approximately the conduction angle range 90 degrees to 150 degrees.

Figure 10:
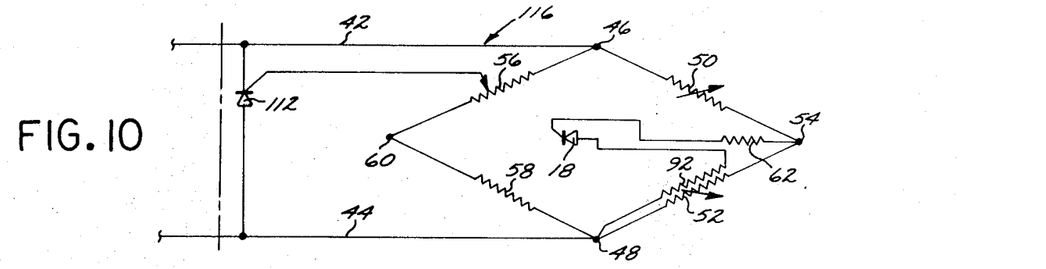
FIG. 10 is a wiring diagram of the system of FIG. 9, modified to provide a cooling only function.

The temperature control system 116 of FIG. 10 is identical to that of FIG. 9, except that the anode and cathode leads of the rectifier 112 are reversed so that the anode lead is connected to the lead 44, and the cathode lead is connected to the lead 42.

Figure 11:
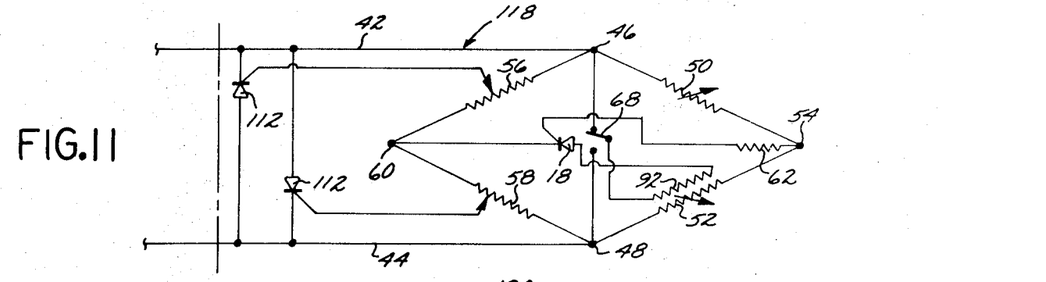
FIG. 11 is a wiring diagram of the system of FIG. 9, modified to provide both heating and cooling functions with manual changeover.

In FIG. 11, there is illustrated a temperature control system 118 which is a combination of the systems of FIGS. 9 and 10 to provide both heating and cooling, with manual changeover. Thus, both the rectifier 112 of system 114 and the rectifier 112 of system 116 are utilized in the system 118, as illustrated, with a switch 68, identical to the switch of the system 66 of FIG. 2, being utilized to switch between the heating and cooling functions.

Figure 12:
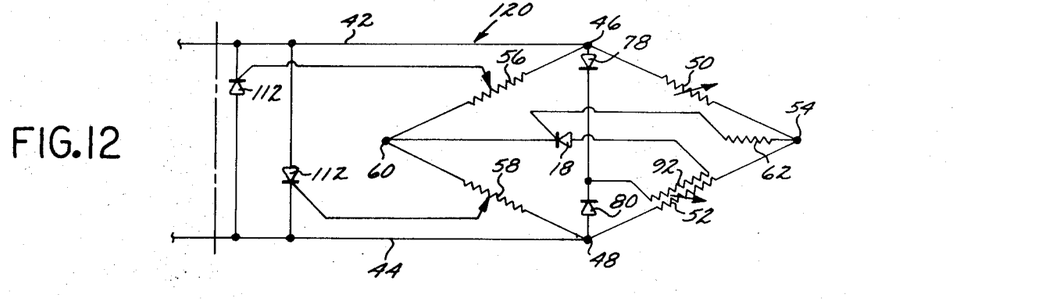
FIG. 12 is a wiring diagram of the system of FIG. 9, modified to provide both heating and cooling functions with automatic changeover.

A temperature control system 120 is illustrated in FIG. 12, and which is identical to the system of FIG. 11, except that diodes 78 and 80 are substituted for the manual changeover switch 68 to provide automatic chanegover instead, the diodes 78 and 80 being identical to the corresponding elements illustrated in the system 76 of FIG. 3.

The diodes 78 and 80 operate to direct current flow to the rectifier 18 during the half cycle when it is conducting, but blocking reverse current flow during the other half cycle, as previously explained in conjunction with the system 76 of FIG. 3.

With the systems of FIGS. 9 through 12 it will be apparent that upon triggering of the rectifier 18, substantially all of the current passes through the rectifier 112, effectively shortening out the bridge circuit.

While particular temperature control systems of the present invention have been described in some detail, changes and modifications may occur to those skilled in the art without departing from the spirit of the invention, and it is therefore intended that the present invention be limited in scope only by the terms of the following claims.

I claim:

1. In a temperature control system adapted for connection in circuit with a source of alternating current and an environmental temperature change apparatus which includes heating and cooling impedances in circuit with said source for actuating heating and cooling sources, respectively, and each connected with current director means operative to provide current conductance across the associated one of said heating and cooling impedances, and wherein said temperature control system is characterized by a relatively high impedance alternating current bridge circuit which includes temperature selection means adjustable to provide an impedance value corresponding to a desired environmental temperature, and temperature sensitive means responsive to the actual environmental temperature to provide an impedance value affording a voltage unbalance across said bridge circuit upon attainment of a predetermined difference between said desired and said actual environmental temperatures; the improvement comprising:

normally open-circuited first switching means responsive to said voltage unbalance to become close-circuited and thereby provide a relatively low impedance path;

first and second impedances in said bridge circuit to provide a relatively high impedance path between said source and said temperature change apparatus, said first impedance being connected in parallel with said first switching means whereby said close-circuiting thereof shorts out said first impedance;

and normally open-circuited second switching means responsive to said close-circuiting of said first switching means to become close-circuited and to short out at least said second impedance whereby substantially the full voltage previously existing across said first and second impedances during balance of said bridge circuit is applied to one of said heating and cooling impedances of said temperature change apparatus upon attainment of said voltage unbalance.

2. The improved temperature control system of claim 1 wherein said first switching means comprises a controlled rectifier having its gate electrode and cathode connected across said bridge circuit for triggering said rectifier in its forward biased condition upon attainment of a voltage unbalance in said bridge circuit in excess of the rectifier gating voltage, and having its anode and cathode normally connected in series with said source and said temperature change apparatus, said first impedance being connected in parallel with the rectifier anode and cathode whereby rectifier triggering shorts out said first impedance.

3. The improved temperature control system of claim 2 and including a first pair of current director means in circuit with the output side of said second switching means and in parallel with said bridge circuit, said first pair of current director means being operative to provide current conductance from said second switching means to said source;

and third switching means in circuit with the rectifier anode and movable between one position connecting said rectifier anode with one side of said source, and another position connecting said rectifier anode with the other side of said source whereby said rectifier is forward biased only on the alternate half cycles of the alternating current source.

4. The improved temperature control system of claim 3 and further including a second pair of current director diodes in circuit with the rectifier anode and in series with said source, said second pair of diodes being operative to provide current conductance from opposite sides of said source, respectively, whereby said rectifier is forward biased on both half cycles of the alternating current source.

5. The improved temperature control system of claim 2 wherein said second switching means comprises a second controlled rectifier and a third controlled rectifier, each of which is connected in parallel with said bridge circuit, in opposite current directing relation, for operation to provide one-way current conductance across the associated one of said heating and cooling impedances, and each including a gating lead in circuit with the output side of the first-mentioned controlled rectifier, said second and third rectifiers being adapted for operation upon triggering of said first-mentioned rectifier; and further including third switching means in circuit with the anode of said first-mentioned rectifier and movable between one position connecting said anode in circuit with one side of said source, and another position connecting said anode in circuit with the other side of said source whereby said first-mentioned rectifier is forward biased only on the alternate half cycles of the alternating current source.

6. The improved temperature control system of claim 2 wherein said second switching means comprises a second controlled rectifier and a third controlled rectifier, each of which is connected in parallel with said bridge circuit, in opposite current directing relation, for operation to provide one-way current conductance across the associated one of said heating and cooling impedances, and each including a gating lead in circuit with the output side of the first-mentioned controlled rectifier, said second and third rectifiers being adapted for operation upon triggering of said first-mentioned rectifier; and further including a pair of current director diodes in circuit with the anode of said first-mentioned rectifier and in series with said source, said pair of diodes being operative to provide current conductance from opposite sides of said source, respectively, whereby said first-mentioned rectifier is forward biased on both half cycles of the alternating current source.

7. The improved temperature control system of claim 2 and including feedback resistance means in the anode circuit of said rectifier and in thermally coupled relation to said temperature sensitive means whereby on rectifier firing said feedback resistance means tends to heat said temperature sensitive means at a predetermined rate.

8. The improved temperature control system of claim 4 and including a pair of series coupled feedback resistance means in thermally coupled relation to said temperature sensitive means and connected to said second pair of diodes and at their junction to the rectifier anode circuit whereby, on rectifier firing, that one of said pair of feedback resistance means associated with that one of said second pair of diodes which is conducting current tends to heat said temperature sensitive means at a predetermined rate.

References Cited

UNITED STATES PATENTS 3,292,687   12/1966   Evans _______________ 165—26

ROBERT A. O'LEARY, Primary Examiner

C. SUKALO, Assistant Examiner

U.S. Cl. X.R.

219—499